United States Patent
Mahyar et al.

(10) Patent No.: US 11,582,522 B1
(45) Date of Patent: Feb. 14, 2023

(54) INTERACTIVE ENTERTAINMENT CONTENT

(71) Applicant: Amazon Technologies, Inc., Seattle, WA (US)

(72) Inventors: Hooman Mahyar, Seattle, WA (US); Shiva Krishnamurthy, Sammamish, WA (US); Steven David Prinz, Los Angeles, CA (US); Craig Critchley, Seattle, WA (US); Arjun Cholkar, Bothell, WA (US); Andrew James McVeigh, Malibu, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/332,498

(22) Filed: May 27, 2021

(51) Int. Cl.
| | |
|---|---|
| *H04N 21/4722* | (2011.01) |
| *H04N 21/45* | (2011.01) |
| *G06F 16/78* | (2019.01) |
| *H04N 21/431* | (2011.01) |
| *H04N 21/478* | (2011.01) |
| *H04N 21/4402* | (2011.01) |

(52) U.S. Cl.
CPC ..... *H04N 21/4722* (2013.01); *G06F 16/7867* (2019.01); *H04N 21/4312* (2013.01); *H04N 21/4402* (2013.01); *H04N 21/4532* (2013.01); *H04N 21/478* (2013.01)

(58) Field of Classification Search
CPC ........... H04N 21/4722; H04N 21/4312; H04N 21/4402; H04N 21/4532; H04N 21/478; G06F 16/7867
See application file for complete search history.

(56) References Cited

U.S. PATENT DOCUMENTS

| | | | | |
|---|---|---|---|---|
| 9,723,374 | B2 * | 8/2017 | Abramson | H04N 21/23418 |
| 9,998,794 | B1 * | 6/2018 | Newell | H04N 21/8133 |
| 10,284,889 | B1 * | 5/2019 | Jimenez | H04N 21/262 |
| 10,455,297 | B1 * | 10/2019 | Mahyar | H04N 21/4532 |
| 10,542,319 | B2 * | 1/2020 | Stoksik | H04N 21/466 |
| 11,265,597 | B2 * | 3/2022 | Gupta | H04N 21/8456 |
| 2003/0126600 | A1 * | 7/2003 | Heuvelman | H04N 21/4333 725/35 |
| 2012/0192227 | A1 * | 7/2012 | Fleischman | H04N 21/43074 725/34 |
| 2013/0339998 | A1 * | 12/2013 | Arme | H04N 21/4722 725/32 |

(Continued)

*Primary Examiner* — Fernando Alcon
(74) *Attorney, Agent, or Firm* — Lee & Hayes, P.C.

(57) ABSTRACT

A system can be configured to receive entertainment content requested by a user and identify content segments and content features from the entertainment content. The content segments can be utilized to identify portions of the entertainment content for enrichment and/or enhancement by the system. The content features can be utilized to associate the entertainment content and the content segments with supplemental content that includes or is associated with the content features. The content features can indicate genres, scene classifications, significant figures credited with creating the entertainment content, and other points of interests for users interested in the entertainment content. The associations between the entertainment content and the supplemental content can enable the system to engage the users by presenting the supplemental content determined to match interests of the users.

20 Claims, 9 Drawing Sheets

(56) References Cited

U.S. PATENT DOCUMENTS

| | | | |
|---|---|---|---|
| 2015/0082349 A1* | 3/2015 | Ishtiaq | H04N 21/4828 |
| | | | 725/40 |
| 2015/0256903 A1* | 9/2015 | Walker | H04L 65/613 |
| | | | 725/32 |
| 2016/0182954 A1* | 6/2016 | Nguyen | H04N 21/8133 |
| | | | 725/10 |
| 2017/0017861 A1* | 1/2017 | Patil | H04N 21/466 |
| 2020/0021873 A1* | 1/2020 | Swaminathan | G06N 3/08 |
| 2020/0304876 A1* | 9/2020 | Cielak | H04N 21/266 |
| 2021/0105527 A1* | 4/2021 | Casagrande | H04N 21/4331 |
| 2021/0274244 A1* | 9/2021 | Wondra | H04N 21/812 |
| 2022/0070537 A1* | 3/2022 | Younessian | H04N 21/4316 |

\* cited by examiner

INTERACTIVE ENTERTAINMENT CONTENT

BACKGROUND

Presently, end credits and information associated with entertainment content are presented to a user via a non-interactive interface that provides a large amount of textual information that is presented to the user via a relatively poor data representation scheme. Additionally, interactions between consumers of entertainment content and the information included in the end credits is generally limited to accelerating the presentation of the information (e.g., fast forwarding through the credits to check for mid-credit scenes) or entirely disregarding the end credits. Further, the end credits and other information associated with the entertainment content commonly fail to effectively communicate with and engage consumers that are otherwise interested in the entertainment content. Accordingly, the presentation of information via a largely static or minimally dynamic interface obfuscates information that the consumers may engage with if given the opportunity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
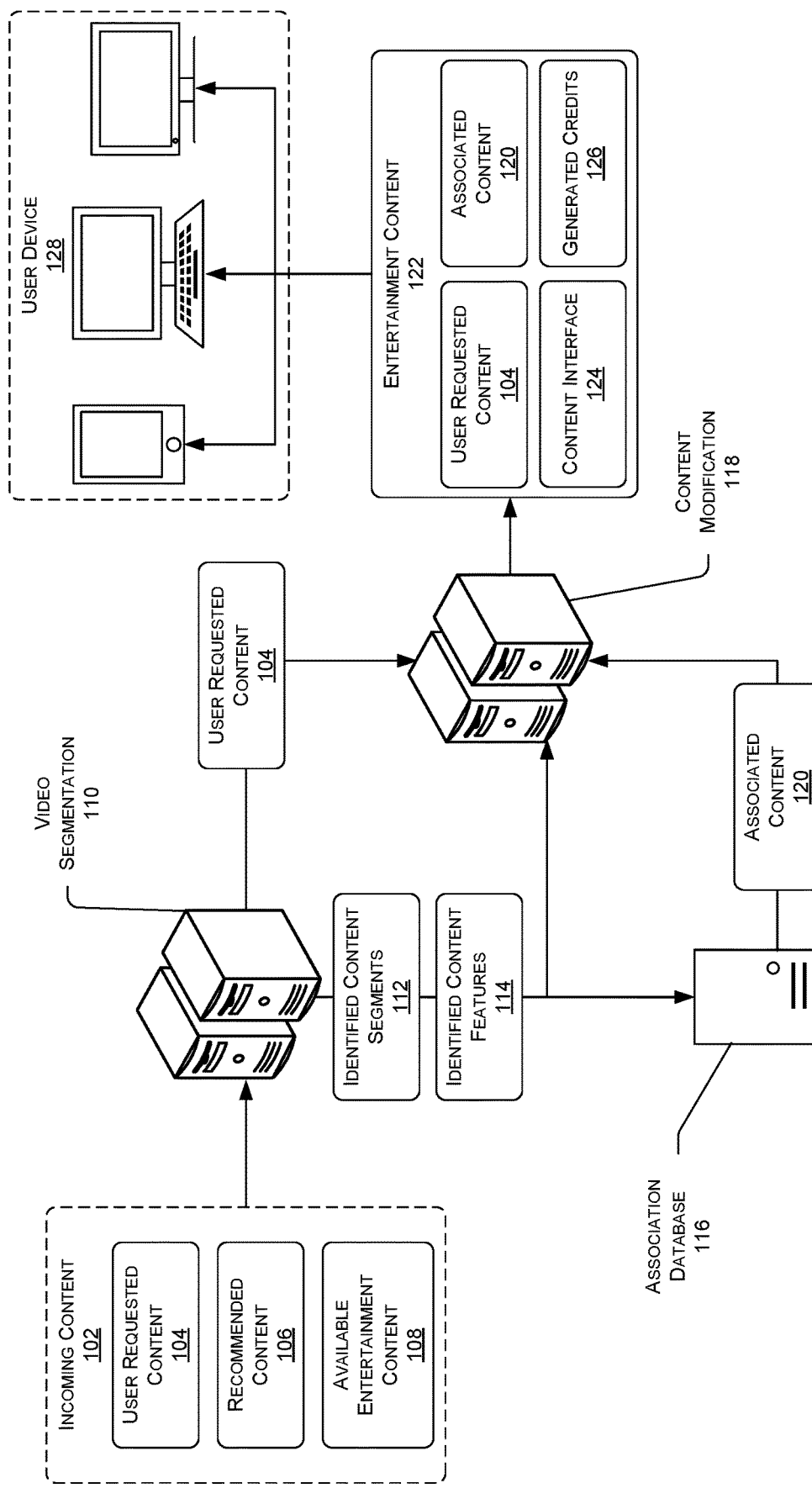
FIG. 1 illustrates an entertainment modification system configured to analyze requested user content and generate modified user content for presentation to a user in place of end credits for the entertainment content.

Described herein are techniques for providing improved representation of information associated with entertainment content and enriching a consumer experience associated with the information. In some examples, the techniques can be utilized to generate an interactive interface that provides the consumer the ability to interact with end credits, information regarding individuals associated with the entertainment content, re-experience highlights of the entertainment content, discover additional entertainment content that is associated with the entertainment content consumed by the consumer, and additional enhancements that can be applied to the end credits. In particular, the consumer can request the entertainment content from a service platform and be provided the entertainment content for consumption (e.g., viewing, listening, watching, etc.). Additionally, the systems and methods described herein can analyze the entertainment content and identify segments of content that have been associated with supplemental content and information within a database. Alternatively, or in addition, the entertainment content can be analyzed to identify segments of content that can be compared with additional entertainment content within the database to determine the supplemental content for the enhanced end credits. Accordingly, the entertainment content can be analyzed to identify significant portions of the entertainment content that can be utilized to identify the related content for presentation to the consumer.

In some examples, the techniques described herein can enable a system to generate enhanced end credits for entertainment content consumed by a user (e.g., the consumer). In particular, the system can be configured to enhance the display of information associated with the end credits and provide visualization of the information via a user interface that can replace and/or enhance the end credits of the entertainment content. Additionally, the user interface can enable the user to interact with the end credits, the entertainment content, and/or the supplemental information that is associated with the entertainment content. Accordingly, the system can be configured to analyze the end credits, determine additional information associated with the end credits and/or the entertainment content, and present the additional information via the user interface. Further, the user interface can be configured to enable the user to discover the additional information associated with interests of the user and navigate to additional content that is of interest to the user.

In some examples, the techniques described herein can enable a system to generate enriched end credits for entertainment content consumed by a user. In particular, the system can be configured to enrich the information provided to a user during the end credits of the entertainment content. More specifically, the system can be configured to analyze the end credits, identify significant features of the end credits, and incorporate additional information associated with the significant features into the end credits. Additionally, the additional information can be presented to the user via an interactive user interface that provides access to particular portions of the entertainment content, supplemental content associated with the entertainment content, highlights of the entertainment content, and/or other content that is associated with the entertainment content. Accordingly, the user can complete the entertainment content and receive additional interaction points for the entertainment content that can enrich the user experience of the entertainment content for the user. For example, the system can be configured to determine that the user has historically sought out music tracks from movies that the user has enjoyed. Further, the system can be configured to determine one or more music tracks from a movie watched by the user and insert the one or more music tracks, via the user interface, into the end credits to enable the user to access the one or more music tracks.

In some examples, the techniques described herein enable the entertainment content to be enriched with supplemental content that is associated with the entertainment content. In particular, a system can be configured to analyze the entertainment content and identify association information for the entertainment content. The association information can identify significant figures (e.g., actors, actresses, animators, etc.) associated with the entertainment content, creators of the content (e.g., directors, composers, writers, etc.), specific content (e.g., music, highlights, etc.), genre information, and other information associated with the entertainment content. Additionally, the system can be configured to utilize the association information to determine the supplemental content that is related to the entertainment content based at least on the association information identified from the entertainment content. The supplemental content can be utilized by the system to generate a user interface that provides the supplemental content to the user based at least on the association information. For example, the system can determine that the lead actress of a movie has a role in a recently released movie that may be of interest to the user. Further, system can identify the supplemental information associated with the actress, the movie, and/or the recently released movie and generate the user interface for the user. Accordingly, the system can generate the user interface configured to facilitate providing the supplemental information associated with the actress in association with the portion of the end credits that identify the actress. Generally, the system can generate the user interface to provide the supplemental content to the user in association with relevant portions of the end credits and enable the user to access the supplemental content via the user interface.

In some examples, the techniques described herein enable the entertainment content to be utilized to generate a user profile that includes one or more user preferences. In particular, the user profile can include indications of entertainment content preferences, peripheral content preferences, genre preferences, segment associations, user interests, and other indications that are determined based at least on consumption patterns of the user. Additionally, the user profile can enable the system to generate an interactive user interface that can replace the end credits, enhance the end credits, and/or enrich the end credits associated with the entertainment content. It should be noted that, while the user interface can be utilized to alter the end credits of the entertainment content, the user interface can additionally be provided to the user on demand, as a recommendation for the entertainment content, and/or passively during navigation of the service platform. For example, the user profile can include indications that the user prefers recorded sports content, sports movies associated with real-world inspiration, has a tendency to skim the entertainment content for highlights and/or pivotal events, and watches interviews of famous athletes. Accordingly, the user profile can enable the system to determine that providing, via the user interface, interviews from athletes that inspired a sports movie, commentary from athletes associated with the sports movie, and/or a highlight reel from the sports movie may induce the user to access and view the sports movie. Further, the user interface can be configured to include the interviews, the commentary, and the highlight reel and can be provided to the user as a portion of a menu, the end credits of an additional sports movie, and/or in response to the user previewing the sports movie. The user interface can also enable the user to access the interviews, the commentary, and/or the highlight reel via the user interface during the end credits of the sports movie.

In some embodiments, the described techniques can utilize machine learning algorithms and/or other artificial intelligence (AI) techniques (e.g., neural networks) to analyze user preferences, analyze entertainment content, identify supplemental content, and generate user interface templates that can be populated with the supplemental information for presentation to a user. In particular, machine learning algorithms (or other AI techniques) can be utilized to evaluate user content consumption patterns to identify supplemental content that is associated with a user preference (e.g., the user has a preference for a review source, the user has an additional preference for an actor, the user has a further preference for accessing music from viewed movies, etc.). Additionally, the machine learning algorithms (or other AI techniques) can be utilized to analyze the entertainment content to identify content segments (e.g., portions of the entertainment content such as an introduction, a climax, an ending, end credits, director commentary, after credit scenes, etc.), content types (e.g., identifiable scenes and features of the entertainment content such as a fight scene, a romance scene, an action scene, etc.), and external associations for the entertainment content (e.g., information associated with a lead actor, other content made by a director, additional music produced by a composer, etc.). Further, the machine learning algorithms (or other AI techniques) can be utilized to inter-relate the supplemental content with the entertainment content and additional content that is determined to include similar themes, genre features, individuals, and other significant features.

Currently, end credits and similar information associated with a movie and/or other entertainment content is presented to a user via a non-interactive interface. Additionally, the end credits are commonly listed for the user to review and fail to provide any additional context or access to the information that the end credits are attempting to convey. Further, the end credits are commonly the least engaging portion of the entertainment content and are commonly skipped by users unless there is additional entertainment content spliced into the end credits that essentially force the users to view the end credits. Accordingly, providing a user interface that enhances and enriches the end credits, or other similar information, with supplemental content provide the users an opportunity to further engage with the entertainment content that is being consumed.

Additionally, the end credits are commonly manually generated by individuals who review the entertainment content and production of the entertainment content to compile the end credits from relevant information. Further, the end credits are commonly generated to include basic information associated with the entertainment content. In particular, analyzing the entertainment content to identify supplemental information can enable the end credits to be enhanced with additional interaction points for users and enable the described techniques to generate the end credits (and/or related information) substantially automatically for user consumption. The automated generation of the end credits can reduce or eliminate the manual effort currently utilized to produce content that is also largely ignored. Accordingly, automated generation of end credits that are presented via a user interface that is configured based on user preferences can reduce the cost and effort of creating the end credits and increase user interaction with the entertainment content, related entertainment content, and/or the service platform associated with the entertainment content.

It should be noted that enhancement operations and enrichment operations can include substantially similar or substantially distinct steps to improve user experiences with end credits and additional content. In particular, enhancement operations can refer to methods and systems that are configured to improve communication of information to a user and enable the user to discover supplemental content associated with the entertainment content. Similarly, enrichment operations can refer to methods and systems that are configured to incorporate additional information from the entertainment content into the end credits, incorporate the supplemental content into the end credits, and identify features of the entertainment content for the user. Accordingly, the enhancement operations and the enrichment operations can refer to complementary, but distinct methods and systems or integrated methods and systems that enable a user interface to be generated to improve the experience for the user. Additionally, while many examples will discuss enhancement and enrichment of the end credits for the entertainment content, the enhancement operations and the enrichment operations can be configured to generate preview information, recommendation information, a search interface for the user, and other means of enabling the user to access additional entertainment content.

FIG. 1 illustrates an entertainment modification system configured to analyze requested user content and generate modified user content for presentation to a user in place of end credits for the entertainment content. In particular, FIG. 1 illustrates an system 100 that is configured to receive incoming content 102 that includes user requested content 104, recommended content 106, and available entertainment content 108. The incoming content 102 is received by a video segmentation system 110 that analyzes the incoming content to generate identified content segments 112 and identified content features 114 that are provided to an association database 116. Additionally, the identified content segments 112 and the identified content features 114 can be sent from the video segmentation system 110 to a content modification system 118. Similarly, the association database 116 can transmit, based at least on an indication received from the video segmentation system 110 and/or the content modification system 118, associated content 120 that was identified based on the identified content segments 112 and the identified content features 114. Accordingly, the content modification system 118 can be configured to generate entertainment content 122 comprising the user requested content 104 and the associated content 120 that is configured to provide a content interface 124 and generated credits 126 to a user device 128.

In some examples, the incoming content 102 can be entertainment content that is requested by a user, entertainment content that is obtained by the system 100 based on user preferences, and/or entertainment content that is associated with previously analyzed entertainment content. In particular, the incoming content can include entertainment content (e.g., films, television shows, interviews, reviews, books, audio programming, etc.) that has been obtained by or received by the entertainment modification system as the user requested content 104, the recommended content 106, and the available entertainment content 108. More specifically, the user requested content 104 can be entertainment content that is associated with a user request transmitted from a user device 128 to the system 100, to an associated service platform configured to display entertainment content for the user via the user device 128, and/or to a third-party entertainment content source. Independent of where the user request was received, the user requested content 104 can be transmitted to the video segmentation system 110 for analysis. Additionally, the recommended content 106 can be entertainment content that is obtained and/or received by the video segmentation system 110 in response to and/or in association with a request for recommended content 106, wherein the request for the recommended content 106 can be transmitted by the system 100 and/or the service platform associated with the system 100. The request for recommended content 106 can be configured to specify the recommended content 106 to be analyzed and/or enriched and/or request that the system 100 provide the recommended content 106 from an associated database. Further, the available entertainment content 108 can be entertainment content that is provided to the system 100 by the service provider associated with the system 100 and/or the third-party entertainment content source. In particular, the incoming content 102 can be comprised of entertainment content that originates and/or is provided to the system 100 by one or more entertainment content sources (e.g., digital entertainment distributor, streaming platform, digital film library, etc.). It should be noted that the incoming content 102 can be provided to the enrichment system based at least on a direct request for entertainment content that is to be enriched (e.g., user requested content 104, recommended content 106, etc.) and/or an indication that the entertainment content is to be utilized to enrich other entertainment content (e.g., recommended content 106, available entertainment content 108). Accordingly, incoming content 102 can include entertainment content from one or more content sources that is provided to and/or obtained by the system 100.

In some examples, the video segmentation system 110 can be configured to analyze the incoming content 102 and generate identified content segments 112 (e.g., identify an introduction segment, a primary content segment, an end credit segment, a director commentary segment, etc.) and identified content features 114 (e.g., scenes, a genre for the incoming content 102, genres for the scenes, actors, actresses, directorial styles, etc.). In particular, the identified content segments 112 can be segments of the incoming content that are identified and associated with one or more segment flags. For example, the incoming content 102 can be analyzed to determine the identified content segment 112 that include an introduction segment, a body segment, an end credit segment, a logo segment, and other segments within the incoming content 102. Similarly, the identified content features 114 can be determined from the incoming content 102. The identified content features 114 can include a genre, a lead actor/actress, one or more scenes that are associated with specific tag (e.g., fight scenes, battle scenes, climax for the entertainment content, iconic scenes from the entertainment content, etc.), and other features of the entertainment content that are or may be of interest to the user. Accordingly, the video segmentation system 110 can be configured to receive the incoming content 102, analyze the incoming content, and determine individual portions of the incoming content 102 that are then mapped to the identified content segments 112 and/or the identified content features 114. Additionally, the individual portions of the incoming content 102 can be mapped to the identified content segments 112 and/or the identified content features 114 based on data associated with the incoming content 102 (e.g., chapter titles, formatting of the entertainment content, determination of the entertainment content type, analysis of the end credits, etc.) and/or data determined from the incoming content 102 (e.g., utilizing machine learning techniques to analyze the incoming content 102 and determine the identified content segments 112 and/or the identified content features 114 via a trained machine learning algorithm).

In some examples, the identified content segments 112 and/or the identified content features 114 can be transmitted to the association database 116. In particular, the association database 116 can be configured to associate a content segment of the identified content segments 112 with one or more additional content segments that have been identified from additional entertainment content. Similarly, the association database 116 can be configured to associate a content feature of the identified content features 114 with one or more additional content features that have been identified from the additional entertainment content. The associations between the content segment/the content feature and the one or more additional content segments/the one or more additional content features can be utilized to identify related entertainment content that is associated with the incoming content 102 analyzed by the video segmentation system 110. Additionally, the identified content segments 112 and the identified content features 114 can be utilized by the association database 116 to develop the associations stored by the association database.

In at least one example, the incoming content 102 can be associated with identified content segments 112 that indicate that a first entertainment content is a version of entertainment content that includes director's commentary regarding creation of the entertainment content. Additionally, the association database 116 can include a second entertainment content that is an additional version of the entertainment content that is a standard release of the entertainment content. The determination that the first entertainment content and the second entertainment content are different versions of the entertainment content enables the association database 116 to link the first entertainment content and the second entertainment content such that preexisting associations from the second entertainment content are associated with the first entertainment content. Further, new associations made based on the first entertainment content can be applied to the second entertainment content. Accordingly, the incoming content can be incorporated into the association database to generate connections between the incoming content 102 and previous analyzed content stored by the association database 116 based on the identified content segments 112 and the identified content features 114.

In some examples, the user requested content 104 can be provided to the content modification system 118. In particular, the video segmentation system 110 can be configured to provide the user requested content 104 to the content modification system 118 for modification before presentation to the user device(s) 128. Additionally, the video segmentation system 110 can be configured to provide the user requested content 104 to the content modification system after the identified content segments 112 and the identified content features 114 have been generated. Alternatively, or in addition, the user requested content 104 can be provided to the video segmentation system 110 and the content modification system 118 independently and/or at substantially the same time. Accordingly, the content modification system 118 can be configured to receive the user requested content 104 and enrich the user requested content with information received from the video segmentation system 110 and/or the association database 116.

In some examples, the identified content segments 112 and the identified content features 114 can be provided to a content modification system 118 by the video segmentation system 110. In particular, the identified content segments 112 and the identified content features 114 can be provided to the content modification system 118. Additionally, associated content 120 can be provided to the content modification system 118. The content modification system 118 can receive and utilize the identified content segments 112, the identified content features 114, and the associated content to enrich the user requested content 104. More specifically, the identified content segments 112 and the identified content features 114 can be utilized to identify portions of the user requested content 104 and/or the user requested content 104 as a whole that can be enriched via the associated content 120. The identified content segments 112 can enable the content modification system 118 to identify portions of the user requested content that are to be enrich, such as the end credits. Further, the identified content features can be utilized to identify specific features within the end credits that are to be enriched with the associated content 120. For example, the content modification system 118 can identify a portion of the end credits that list a lead female role as performed by a lead actress based on the identified content features 114 indicating that the lead actress is in the user requested content 104 and the portion of the end credits that list the lead actress. Additionally, the association database 116 can provide associated content 120 that includes images of the lead actress at the premier of the user requested content 104, during filming of the user requested content 104, and/or of additional roles that the lead actress has portrayed. Accordingly, the content modification system 118 can be configured to enrich the end credits by augmenting the end credits and/or replacing the end credits with the associated content 120 based on the identified content features 114. For example, the end credits can be enriched by embedding links, graphics, photographs, videos of interviews and commentary, music, interfaces that include information regarding other movies associated with the actor/actress, and other associated content 120 that has been identified for user requested content 104 and/or the incoming content 102. Further, the content modification system 118 can determine, based on the identified content features 114, that news articles, interviews, and commentary from the lead actress are to be linked to the end credits such that the user can access the associated content 120 via the user requested content 104.

In some examples, the content modification system 118 can be configured to generate a content interface 124 and generated credits 126 for the user requested content 104 based on the identified content segments 112, the identified content features 114, and/or the associated content 120. More specifically, the content modification system 118 can be configured to generate and/or populate a content interface 124 for presentation of individual portions of the user requested content 104 (e.g., segments of the user requested content 104 determined at least in part on the identified content segments 112). In particular, the content interface 124 can be populated with the generated credits, wherein the generated credits include the end credits of the user requested content that have been enriched to include the associated content 120 and/or have been modified to more effectively present the associated content 120 in combination with information provided by the end credits. Additionally, the content interface 124 can be configured based on pre-existing interface templates that are associated with presentation of different types of associated content 120. For example, the content modification system 118 can include interface templates for presenting associated content 120 that is related to actors/actresses, directors, composers, content genres, content highlights, content reviews, and other types of associated content 120 that may be associated with the user requested content. Accordingly, the content modification system 118 can be configured to populate the interface templates to generate the content interface 124 with the generated credits 126.

In some example, the content modification system 118 can be configured to transmit the entertainment content, comprised of the user requested content 104, the associated content 122, the content interface 124, and the generated credits 126 to the user device (or user devices) 128. In particular, the content modification system 118 can be configured to generate the entertainment content 122 for a format specific to a type of the user device 128 (e.g., mobile device, computer, television, virtual reality devices, augmented reality devices, etc.). Alternatively, the content modification system 118 can be configured to generate the entertainment content 122 for a format that is generalized to a plurality of user devices 128. Independent of the formatting, the entertainment content 122 can be generated to include the user requested content 104 for consumption by the user via the user device 128 and the associated content 122 that has been configured to engage the user via the content interface 124 and the generated credits 126.

Figure 2:
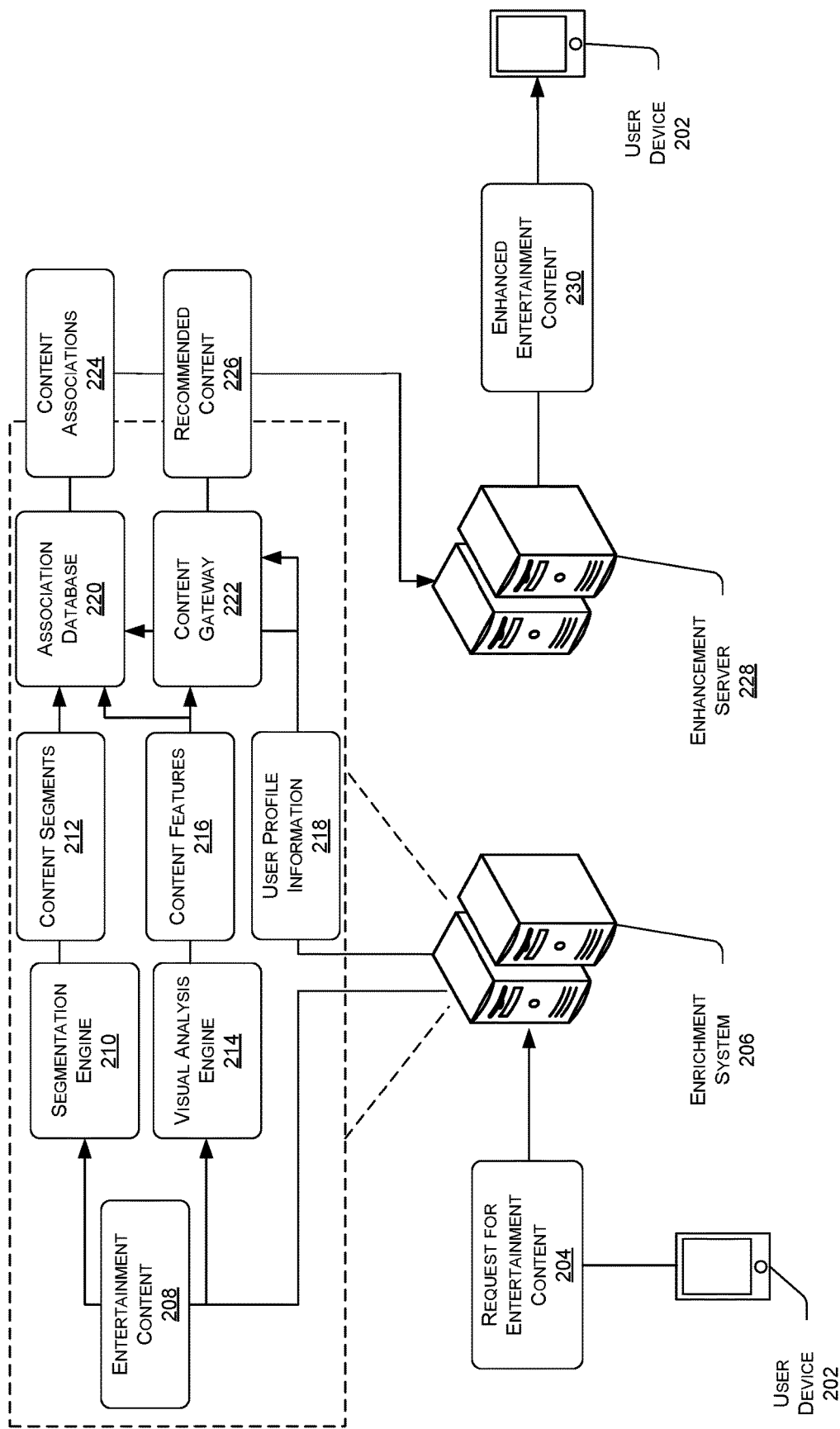
FIG. 2 illustrates an enrichment system for generating enriched entertainment content from entertainment content that is to be presented to a user in place of end credits for the entertainment content.

FIG. 2 illustrates an enrichment system for generating enriched entertainment content from entertainment content that is to be presented to a user in place of end credits for the entertainment content. In particular, a user device 202 can place a request for entertainment content 204 that is received by an enrichment system 206. Additionally, the enrichment system 206 can receive and/or obtain entertainment content 208 based at least on the request for entertainment content 204 and utilize a segmentation engine 210 to identify content segments 212 and a visual analysis engine 214 to identify content features 216. Further, the content segments 212, the content features 216, and user profile information can be provided to an association database 220 and/or content gateway 222. Accordingly, content associations 224 and recommended content 226 can be provided to an enhancement server 228 that is configured to generate and provide enhanced entertainment content 230 to the user device 202.

In some examples, the request for entertainment content 204 can be received by the enrichment system 206, wherein the request for entertainment content 204 can identify the user device 202, a user profile associated with the user device 202, and/or entertainment content 208 that is to be obtained and/or received by the enrichment system 206. In particular, the enrichment system 206 can be configured to receive the request for entertainment content 204 from the user device 202 and obtain the entertainment content 208 and the user profile information from an associated database. Alternatively, or in addition, the enrichment system 206 can be configured to receive the request for entertainment content 204, the entertainment content 208, and the user profile information 218 from an associated service platform and/or a third-party server. Accordingly, the enrichment system 206 can be configured to initiate enrichment of the entertainment content 208 based at least in part on receiving the request for entertainment content 204.

In some examples, the enrichment system 206 can comprise a segmentation engine 210 and a visual analysis engine 214 that are configured to identify the content segments 212 and the content features 216. Additionally, the enrichment system 206 can be associated with and/or comprise an association database 220 and a content gateway 222. In particular, the segmentation engine 210 can be configured to identify the content segments 212 based at least on content data associated with the entertainment content 208 (e.g., visual data, audio data, and metadata that enables a user device to display the entertainment content 208). Similarly, the visual analysis engine 214 can be configured to identify the content features 216 from the content data associated with the entertainment content 208. Further, the enrichment system 206 can be configured to utilize the content segments 212, the content features 216, and the user profile information 218 to obtain recommended content 226 from the content gateway based at least in part on the content associations determined at least in part on the association database 220.

In some examples, the segmentation engine 210 can be configured to identify the content segments 212 of the entertainment content 208. In particular, the segmentation engine 210 can include a machine learning algorithm (or other AI technique) that is configured to identify the content segments 212 within the entertainment content 208. The segmentation engine 210 can be trained to receive the entertainment content 208 and identify the content segments 212, wherein the content segments 212 can include an introduction, a logo, a primary content (e.g., the segment of the film that displays the story and character actions), end credits, commentary, and other segments determined for the entertainment content. The segmentation engine 210 can be trained to identify the content segments 212 based at least on graded training content. The graded training content can be manually trained by an administrator associated with the segmentation engine 210, by another machine learning algorithm, and/or otherwise be provided to the segmentation engine 210. Additionally, the graded training content can be created to include one or more generated segments that are associated with one or more segment features that can be utilized to distinguish between and identify the content segments 212 within the graded training content. Accordingly, the graded training content can be utilized to train the segmentation engine 210 and enable the segmentation engine 210 to identify the content segments 212.

In at least one example, the segmentation engine 210 can be configured to identify the content segments 212 based on segment features that are observed by the segmentation engine from the graded training content. More specifically, the segmentation engine can be configured to analyze the graded training content, detect one or more segment features from the graded training content, and then utilize the one or more segment features from the graded training content to identify the content segments from the entertainment content 208. Additionally, the graded training content (or other support algorithm) can be configured to provide positive feedback and/or negative feedback during training of the segmentation engine 210 (e.g., such as where the segmentation engine uses neural networking techniques to develop the one or more segment features), that can enable the segmentation engine 210 to assign a greater weight to a set of segment features of the one or more segment features that are commonly associated with the content segment(s) 212. Accordingly, the one or more segment features can be patterns within the data of the entertainment content 208, whether visual, audio, digital, or other data, that is utilized to identify the content segments 212.

In some additional examples, the segmentation engine 210 can be trained to identify the content segments 212 associated with the entertainment content 208. In particular, the segmentation engine 210 can be trained to recognize one or more content segments 212 within the entertainment content 208 based at least on the segment features, obtained via the graded training content, that are determined by the segmentation engine 210 within the entertainment content 208. In at least one example, the segment features can include editing techniques (e.g., fast, sequential cuts in a movie can be associated with action and/or fighting scenes), filming techniques (e.g., close proximity filming of actors, hushed speaking tones, etc. can indicate emotionally intense scenes such as romance scenes and/or horror scenes), displayed content at a timestamp (e.g., large amount of white text on a black background at a time step in the last twenty percent of the entertainment content can be associated with end credits), and content data associated with the entertainment content 208 utilized to identify the content segments 212 of the entertainment content 208.

In some further examples, the segmentation engine 210 can be trained to identify the content segments 212 and associate the content segments 212 with segment identifiers. In particular the segment identifiers can be associated with one or more segment types (e.g., introduction segment, primary content segment, end credit segment, director commentary segment, etc.) and can be utilized to identify the content segments for the enrichment system 206. Additionally, the segment identifiers can be associated with individual content segments of the content segments 212 based at least on the segment features that the segmentation engine 210 identifies within the content segments 212.

In some examples, the visual analysis engine 214 can be configured to identify the content features 216 of the entertainment content 208. In particular, the segmentation engine 210 can include a machine learning algorithm (or other AI technique) that is configured to identify the content features 216 within the entertainment content 208. The visual analysis engine 214 can be trained to receive the entertainment content 208 and identify the content features 216, wherein the content features 216 can include individual scenes, actors, actresses, music, actions, sounds effects, and other features that are associated with the entertainment content 208 and/or the content segments 212. The visual analysis engine 214 can be trained to identify the content features 216 based at least on graded training content in a manner similar to the training of the segmentation engine 210. For example, the graded training content can be manually trained by an administrator associated with the segmentation engine 210, by another machine learning algorithm (e.g., a facial recognition algorithm), and/or otherwise be provided to the visual analysis engine 214. Additionally, the graded training content can be created to include one or more generated content features that are associated with one or more identifiers that can be utilized to distinguish between and identify the one or more content features within the graded training content. Accordingly, the graded training content can be utilized to train the visual analysis engine 214 and enable the visual analysis engine 214 to identify the content features 216.

In some additional examples, the visual analysis engine 214 can be trained to identify the content features 216 associated with the entertainment content 208. In particular, the visual analysis engine 214 can be trained to recognize one or more content features 216 within the entertainment content 208 and/or the content segments 212 based at least on the one or more identifiers, obtained via the graded training content, that are utilized by the visual analysis engine 214 to identify the content features 216 within the entertainment content 208. Further, the content features 216 identified by the visual analysis engine 214 can be associated with the entertainment content 208 and/or the content segments 212 of the entertainment content 208. For example, the visual analysis engine 214 can utilize the identifying factors to recognize scenes (e.g., content features 216) within the entertainment content 208 that include a specific actor based on the identifying factors associated with facial recognition. Similarly, the visual analysis engine 214 (or similar system) can utilize the identifying features to recognize a score of the entertainment content 208 within a primary content segment (e.g., the portion of the film that portrays the story and character actions) and recognize a segment of commentary that discussions the creation of the score. Accordingly, content features 216 associated with the entertainment content 208 can be provided to the association database 220 and/or the content gateway 222.

In some examples, the association database 220 can be configured to store and record the content segments 212 and the content features 216. In particular, the association database 220 can include a network of associations between content segments 212 and the content features 216 from a plurality of entertainment contents that have been analyzed by the segmentation engine 210 and the visual analysis engine 214. Alternatively, or in addition, the network of associations can include additional content segments and additional content features from a plurality of additional entertainment contents that are provided to the association database 220. Additionally, the content segments 212 and the content features 216 from the plurality of entertainment contents can be previously identified content segments that are associated with a set of segment features and previously identified content features that are associated with a set of feature identifiers. As noted above, the segment features and the feature identifiers can be recognizable by the segmentation engine 210 and the visual analysis engine 214 to distinguish between individual types of content segments and/or content features. Further, the segment features and the feature identifiers can be shared by sets of content segments and sets of content features across the plurality of entertainment contents to at least partially define genres, scene types, iconic moments, acting histories associated with individual actors and/or actresses, work catalogues associated directors and composers, and other factors that may be shared by a set of entertainment contents. Accordingly, the shared segment features and segment identifiers can enable the association database 220 to connect the entertainment content 208 with other entertainment content via the identified content segments 212 and the identified content features 216.

In some examples, the association database 220 can be utilized to identify associations between the entertainment content 208 and additional entertainment content. More specifically, the identified content segments 212 of the entertainment content 208 can be utilized to identify related content segments from the additional entertainment content. Additionally, the association database 220 can receive the identified content segments 212 associated with the entertainment content 208 and determine that one or more additional content segments are the related content segments based at least on one or more segment features that are shared by the identified content segments 212 and the related content segments. Further, the association database 220 can transmit the related content segments as content associations 224 to the enhancement server 228. For example, the association database 220 can include an extended version of the entertainment content 208 that includes a director commentary segment, a making-of segment, and an interview segment. Additionally, the entertainment content 208 requested by the user device 202 can be the standard version of the entertainment content 208 that does not include the director commentary segment, the making-of segment, and the interview segment. However, in response to determining that the content segments 212 of the entertainment commentary at least partially match the related content segments associated with the extended version, the association database 220 can determine that the entertainment content 208 and the extended versions are two versions of the same entertainment content. Accordingly, the association database 220 can determine a content association 224 between the entertainment content 208 and the extended version of the entertainment content.

In some additional examples, the association database 220 can be utilized to identify associations between the entertainment content 208 and additional entertainment content. More specifically, the identified content features 216 of the entertainment content 208 can be utilized to identify related content features from the additional entertainment content previously provided to the association database 220. Additionally, the association database 220 can receive the identified content features 216 and determine that one or more additional content features are the related content features based at least on one or more feature identifiers that the visual analysis engine 214 provides the association database 220 in association with the content features 216. The association database 220 can utilize the one or more feature identifiers to determine the related content features and determine that a content association 224 exists between the content features 216 and the related content features. For example, the association database 220 can include a plurality of films that are made by a director. Additionally, the visual analysis engine 214 can determine that the entertainment content 208 is made by a director based at least on feature identifiers that are associated with directorial style and directorial choices of the director. The visual analysis engine 214 can be trained to identify the feature identifiers and determine the content feature 216 that the director is credited with the entertainment content. Further, the association engine can receive the content feature 216 indicating that the entertainment content 208 is associated with the director and the feature identifiers that are associated with the content features 216. Accordingly, the association database 220 can identify other films that are associated with the director indicated by the content feature 216 and the feature identifiers associated with the content feature 216 to generate the content association 224.

In some further examples, the association database 220 can be configured to generate the content associations 224 based at least on user profile information 218 obtained by the enrichment system 206. In particular, the user profile information 218 can be configured to indicate segment features and content identifiers that are commonly identified from previous entertainment content transmitted to the user device 202 and/or other user devices associated with a user profile. Additionally, the segment features and the content identifiers provided as the user profile information 218 can indicate preferences for entertainment content and supplemental content consumption that can be utilized to modify the content associations 224 provided by the association database 220. More specifically, the user profile information 218 can be generated based on past engagement with enriched content and enhanced content via the user device 202 and other user devices associated with the user profile. Further, the user profile information 218 can enable the content associations 224 to be generated to increase user engagement with the enhanced entertainment content 230 provided from the enhancement server 228 to the user device 202. For example, the user profile information 218 can indicate that the user profile is commonly utilized to access supplemental content related to scores of movies and composer commentary regarding recording the score for movies. Accordingly, the association database can receive the user profile information 218, determine that the content features 216 include one or more score tracks (e.g., portions of the score that are associated with individual scenes, themes, and/or characters), and determine that the one or more score tracks have content associations 224 with commentary in an extended version of the entertainment content 208, one or more additional scores associated with films the composer has worked on, a musical performance drafted by the composer, interviews with the composer related to the score of the entertainment content 208, and other supplemental content. In general, the user profile information 218 can be utilized to determine whether the user profile is associated with a preference for types of supplemental content and emphasizing and/or de-emphasizing content associations 224 based on the preference.

In some examples, a content gateway 222 can be utilized to acquire supplemental content from databases associated with the enrichment system 206 and/or the enhancement server 228. Alternatively, or in addition, the content gateway can be utilized to acquire supplemental content from third-party databases. In particular, the content gateway 222 can be an interface that enables the enrichment system 206 generally and/or individual components of the enrichment system 206 to obtain supplemental information from external databases. Additionally, the content gateway 222 can be configured to obtain recommended content 226 based at least in part on the user profile information 218 and the content associations 224. For example, the content associations 224 can include an association between the entertainment content 208 and one or more cast interviews produced for the entertainment content 208 before and after the entertainment content 208 was published. Further, the user profile information 218 can indicate that the user profile is associated with a preference for consuming cast interviews regarding the entertainment content 208. Accordingly, the content gateway 222 can be configured to obtain the one or more cast interviews produced for the entertainment content 208 from a third-party server (e.g., a website associated with the news organization that published the cast interviews) and provide the one or more cast interviews as recommended content 226 to the enhancement server 228.

In some additional examples, the content gateway 222 can be utilized to acquire supplemental content from databases associated with the enrichment system 206 and/or the enhancement server 228. In particular, the content gateway 222 can be configured to receive the content features 216 and/or the user profile information 218 and identify recommended content 226 that is to be obtained and provided in association with the entertainment content 208. More specifically, the content gateway 222 can identify supplemental content that is obtained from external databases based on the content features 216 identified from the entertainment content and the user profile information 218 that indicates one or more types of supplemental content that is consumed via the user device 202 (or other user devices via the user profile). For example, the content features 216 can indicate a large number of horror scenes that are associated with the entertainment content 208. Additionally, the user profile information 218 can indicate that a user commonly researches monsters depicted by horror entertainment content after the user views a horror film. Accordingly, the content gateway 222 can be configured to obtain and provided the recommended content 226 associated with interviews discussing monsters depicted by the content features 216, general information associated with the content features 216, and other information related to the content features.

In some examples, the content associations 224 and the recommended content 226 can be provided to the enhancement server 228 for generation of the enhanced entertainment content 230. In particular, the content associations 224 and the recommended content 226 can be utilized to enhance (e.g., augment, modify, etc.) the entertainment content 208 to generate the enhanced entertainment content 230 for presentation via the user device 202. Additionally, the enhancement server 228 can be configured to utilize the content associations 224 and the recommended content 226 to populate a user interface template to generate a user interface that provides the content associations 224 and the recommended content 226 via the user device 202. Further, the enhancement server 228 can be configured to combine the user interface with at least a content segment of the entertainment content 208 to generate the enhanced entertainment content 230.

Figure 3:
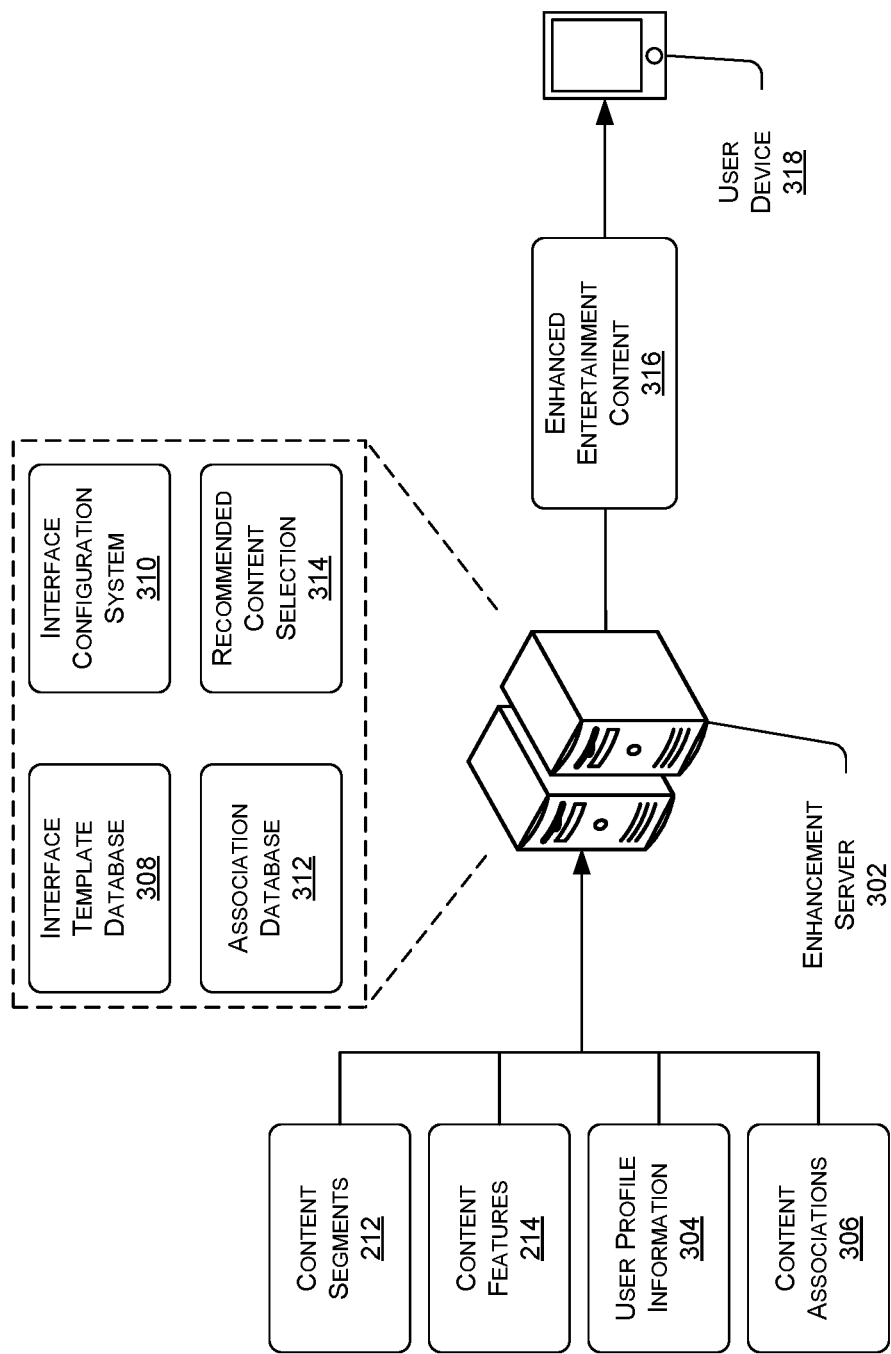
FIG. 3 illustrates a content enhancement system that is configured to receive supplemental content from an enrichment system and generate enhanced entertainment content for a user device.

FIG. 3 illustrates a content enhancement system that is configured to receive supplemental content from an enhancement system and generate enhanced entertainment content for a user device. In particular, an enhancement server 302 can receive content segments (e.g., content segments 212), content features (e.g., content features 216), user profile information 304, and content associations 306 from an associated enrichment system and/or an associated database. Additionally, the enhancement server 302 can utilize the received information to select, from an interface template database 308 and via an interface configuration system 310, a user interface to be populated based on the content associations 306 and an association database 312. Accordingly, the enhancement server 302 can populate the user interface via a recommended content selection system 314 to generate the enhanced entertainment content 316 to the user device 318. It should be noted that the enhancement server 302 can be configured to receive the content segments 212, the content features 216, and other information from the enrichment system described by FIG. 2.

In some examples, the enhancement server 302 can receive and/or obtain the user profile information 304 and determine that the enhanced entertainment content 316 is to be generated and provided to the user device 318. In particular, the user profile information 304 can be associated with an indication that a request for entertainment content was received from a user profile. Additionally, the enhancement server 302 can receive the content segments 212 and the content features 216 from the enrichment system. The content segments 212 and the content features 216 can be utilized in combination with the user profile information 304, the content associations 306, and the association database 312 to determine supplemental content that can be incorporated into the enhanced entertainment content 316. Further, the user profile information 304 and the content associations 306 can be received from the enrichment system (e.g., receive user profile information 218 and content associations 224), obtain the user profile information 304 from a database, and/or determine the content associations via the association database 312. Accordingly, the enhancement server 302 can be configured to obtain information utilized to generate the enhanced entertainment content from the entertainment content requested via the user profile.

In some examples, the enhancement server 302 can include an interface template database 308. In particular, the interface template database 308 can include a plurality of templates that can be populated with the entertainment content and/or supplemental content to generate a user interface that is tailored to the user profile. Accordingly, the interface template database can include interface templates that are configured for individual user profiles and/or categories of user profiles based on content consumption patterns, user preferences, content genres, and other differentiating factors that have been determined to impact user interaction with previous enhanced entertainment content.

In at least one example, the interface template database 308 can include one or more interface templates that can be utilized to generate a user interface based at least on the user profile information 304. It should be noted that the user profile information 304 can include historical consumption data of supplemental content by a user associated with the user profile. Additionally, the one or more interface templates can be configured to identify one or more types of supplemental content (e.g., interviews, commentary, additional entertainment content, recommendations, etc.) that can be utilized to generate the user interface from the one or more interface templates. Further, an interface template can be selected to generate the user interface based on the user profile information 304, wherein the user profile information 304 can be utilized to determine types of supplemental content that the user does and does not consume, how the types of supplemental content consumed changes based on different content features being associated with the entertainment content (e.g., the user tends to minimally engage with supplemental content for some genres and deeply engages with supplemental content for other genres), amounts of supplemental content consumed by the user (e.g., the user consumes between one and three director interviews), and other information related to the supplemental content that the user may consume via the user interface. Accordingly, the one or more interface templates can be individually configured display and/or otherwise present a set of supplemental content, wherein the interface template used to generate the user interface is determined based at least on the supplemental content available for presentation to the user. For example, the entertainment content can be associated with a large number of images of actors and actresses during filming, but relatively few cast interviews. Accordingly, the interface template selected for the user can be configured to account for the supplemental content available for display and can include a navigable slideshow of the images while the cast interviews can remain static until interacted with. Alternatively, the entertainment content can be associated with relatively few images from filming and a large number of cast interviews. The interface template can be configured to display the static images within the same portion of the user interface, but can also be configured to provide a carousel of the cast interviews for the user. Alternatively, a different interface template can be selected that minimizes space in the user interface dedicated to the images and provides additional space to the cast interviews and auto-plays the cast interviews.

In at least one additional example, the interface template database 308 can include one or more interface templates that can be utilized to generate a user interface based at least on the user profile information 304. In particular, the one or more interface templates can be configured to generate user interface(s) for display via a variety of user devices 318 such as mobile devices, computers, tablets, laptops, televisions, and other user devices that enable the user to view, listen to, or otherwise consume the entertainment content. Additionally, the one or more interface templates can be configured to generate user interfaces for presentation in combination with one or more content segments 212 (e.g., a first user interface template for a preview user interface can be configured differently from a second user interface template for an end credit user interface). Accordingly, the interface template database 308 can include the one or more interface templates that can be utilized to generate user interfaces that present the supplemental content to the user based at least on the type of user device 318 associated with the user profile and the content segment 212 that the user interface is associated with.

In some examples, the interface configuration system 310 can be configured to populate an interface template received from the interface template database 308 with content segments 212, content associations 306, and/or supplemental content. It should be noted that the content segments 212 can be inserted into the interface template to generate the user interface or can be analyzed to determine segment information that can be integrated into the user interface. For example, an end credit segment can include a non-interactive list of contributions to a film by a large number of individuals. Within the non-interactive list, the end credit segment can include one or more significant individuals associated with roles and contributions (e.g., leading actor, leading actress, supporting actor, director, writers, producers, composers, etc.). Accordingly, the user interface generated by the interface configuration system 310 may include the non-interactive list, but augment the non-interactive list with interactive elements that expand to reveal and highlight the roles and the contributions associated with the one or more significant individuals. Alternatively, the end credit segment can be replaced by an alternative user interface that includes the roles and the contributions of the one or more significant individuals without the non-interactive list.

In some additional examples, the interface configuration system 310 can be configured to populate the interface template received from the interface template database 308, In particular, the interface configuration system 310 can be configured to integrate supplemental content into the interface template based at least on the content associations 306 obtained by the enhancement server 302. The content associations 306 can be configured to identify supplemental content within the association database 312 that is to be integrated into the interface template. However, and as noted above, the interface can be configured to specify an amount of supplemental content to be incorporate into the user interface that is less than the amount of supplemental content identified by the content associations 306. Accordingly, the recommended content selection system 314 can be configured to identify a set of supplemental content for the user interface that is less than or equal to the amount of supplemental content that can be incorporated into the user interface. Additionally, the interface configuration system 310 can configured to determine transition data between portions of the supplemental content for the user interface (e.g., supplemental content associated with a lead actress is displayed first and then the user interface initiates a transition after an amount of time expires to display supplemental content associated with a composer based on the user profile information 304 indicating the user engages with both the supplemental information associate with the lead actress and the supplemental information associated with the composer).

In some examples, the recommended content selection system 314 can be configured to identify the supplemental content that can be integrated into the user interface. In particular, the recommended content selection system 314 can be configured to identify the supplemental content to be provided to the user via the user interface where the amount of supplemental content available exceeds the amount of supplemental content that the user interface can display. Accordingly, the recommended content selection system 314 can identify a set of supplemental content to be displayed via the user interface. Additionally, the recommended content selection system 314 can be configured to determine the set of supplemental content from the content associations 306 and/or the association database 312 based at least on user preferences and historical content consumption information from the user profile information 304. Further the recommended content selection system 314 can be configured to determine the set of supplemental content based at least on relevance to the entertainment content (e.g., determine relevance of supplemental content based on the number of shared content segments 212, shared content features 216, etc.). Alternatively, or in addition, the set of supplemental content can be determined based on a substantially random selection basis, a first come first served basis (e.g., content associations 306 are determined and/or received until user interface template is populated), availability (e.g., the content associations 306 internal to the association database 312 are preferentially utilized over the content associations 306 referencing supplemental content accessed via a content gateway 222), and/or other basis that select the set of supplemental content independent from the user profile information 304.

In some examples, the enhancement server 302 can be configured to combine the user interface generated by the interface configuration system 310 with the entertainment content obtained by the enhancement server 302. In particular, the user interface can be combined with the requested entertainment contented to generate the enhanced entertainment content 316.

Figure 4:
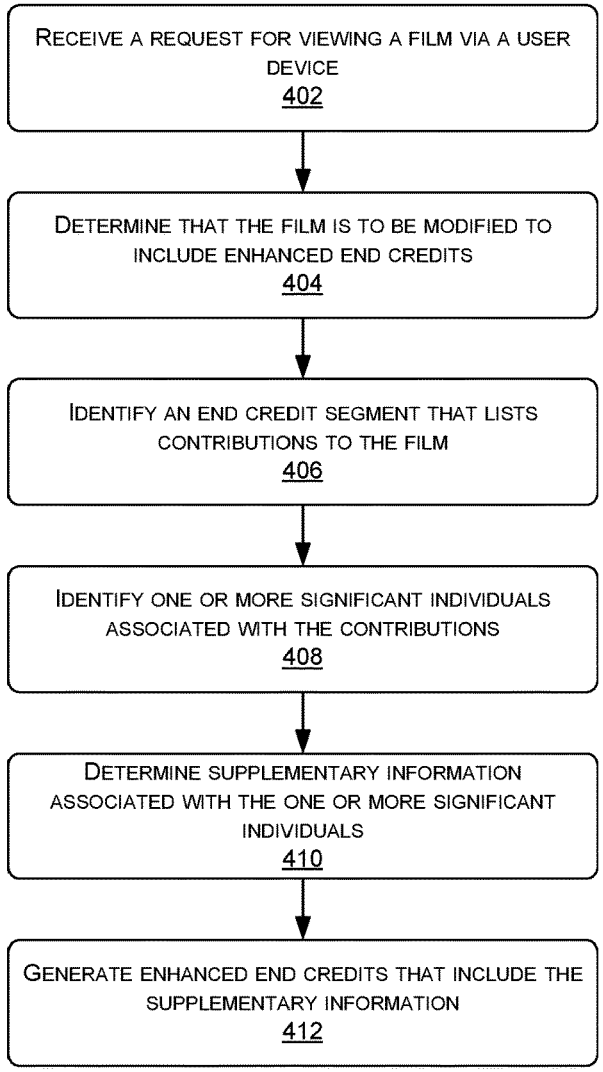
FIG. 4 illustrates flow a diagram that describes a process for generating enhanced end credits for entertainment content, such as a film and/or television show, requested by a user.

FIG. 4 illustrates flow diagram described a process for generating enhanced end credits for entertainment content, such as a film and/or television show, requested by a user.

At block 402, a system can receive a request for viewing a film via a user device. Additionally, the request can include an indication of a user profile, a type of user device, and/or other formatting information for displaying information via the user device.

At block 404, the system can determine that the film is to be modified to include enhanced end credits. In particular, the system can be configured to trigger modification of the film to include enhanced and/or enriched end credits. Alternatively, the request for viewing the film can be associated with an indication that can trigger the modification of the film. More specifically, the indication can be associated with the request for viewing the film based on previous user engagement associated with previous enhancement/enrichment of films, a service provider requesting that the film be enriched and/or enhanced, and/or that the customer experience associated with the film would be improved via enrichment/enhancement of the film.

At block 406, the system can identify an end credit segment that lists contributions to the film. In particular, the system can determine, based at least on film content received and/or obtained from a service platform and/or third-party entity, one or more content segments associated with the film, the one or more content segments including at least an end credit segment that list contributions to the film. As noted above, the one or more content segments can be utilized to categorize portions of the film such as the introduction to the film, primary content of the film, the end credits, and bonus content associated with the film. Additionally, the content segments and the film can be further analyzed to identify content features such as a genre of the film, individual scenes of the films, themes associated with a story of the film, and actors/actresses portraying roles within the film. Further, the identification of contributions to the film can enable the system to associate the actor/actress of a role with scenes and other portions of the film that depict the character. Accordingly, the system can be configured to analyze the film and identify relevant portions of the film for modification and association with supplemental content. For example, identification of scenes where the actor/actress is portraying a character can be associated with iconic scenes that are referenced by director commentary, reviews of the film, and other supplemental information.

At block 408, the system can identify one or more significant individuals associated with the contributions. In particular, the system can determine, based at least on the film, one or more significant individuals that are associated with roles featured in the film, positions leading the design and production of the film, and other notable roles associated with production of the film.

At block 410, the system can determine supplemental information associated with the one or more significant individuals. In particular, the system can determine, based at least on the contributions of the significant individuals, supplemental information associated with the significant individuals, the film, and one or more additional films, wherein the one or more additional films are associated with the significant individuals via an association database that is configured to interrelate the contributions of the significant individuals to the film with the one or more additional films.

In some examples, the significant individuals can include a director that is credited with directing the film, one or more actors and actresses that are credited with roles in the film, a composer that is credited with composing a score of the film, and/or writers that are credited with writing for the film. Additionally, the significant individuals can be credited with multiple roles (e.g., hybrid director and writer for television shows), wherein the supplemental information associated with the significant individual can be provided in association with the relevant role. Further, the significant individuals can be associated with supplemental information that is relevant to the credited role that the significant individual is associated with it. For example, a director can be associated with one or more additional films directed by the director, actors and actresses can be associated with additional roles performed by the actors and actresses, and a composer can be associated with additional scores and music created by the composer. Accordingly, supplemental information associated with significant individuals within the association database.

At block 412, the system can generate enhanced end credits that include the supplemental information. In particular, the system can generate, based at least on the supplemental information stored by the association database, the enhanced end credits, the enhanced end credits configured to display the supplemental information associated with the significant individuals via a user interface displayed by the user device during the end credit segment of the film. Additionally, the supplemental information can be incorporated into the enhanced end credits via references to additional roles the significant individuals completed for the one or more additional films, links to reviews and/or commentary associated with the film, and links to related content such as extended scores, cut scenes, bloopers, commentary associated with the film, and information associated with creation of the film. Accordingly, the enhanced end credits can enable the user to discover and engage with the supplemental content relevant to the film.

Figure 5:
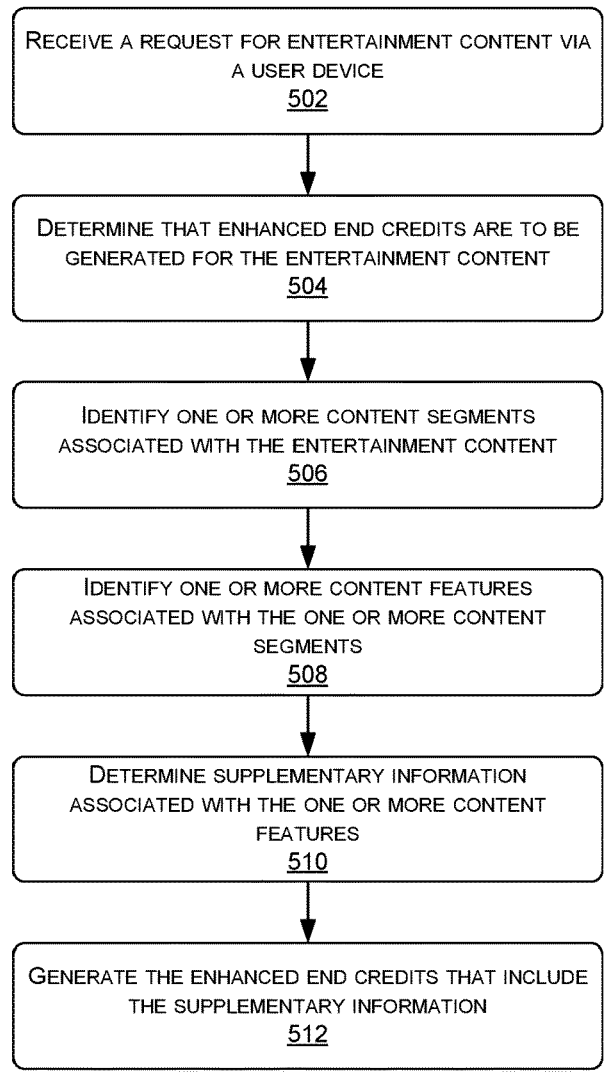
FIG. 5 illustrates an example flow diagram that describes generation of enhanced end credits based on determining content segments and content features that identify supplemental content for the entertainment content.

FIG. 5 illustrates an example flow diagram that describes generation of enhanced end credits based on determining content segments and content features that identify supplemental content for the entertainment content.

At block 502, a request for entertainment content can be received by a system from a user device. In particular, the request can be transmitted to the system by the user device, by a service platform, by a third-party service, and/or other entities associated with provision of entertainment content to users. Additionally, the request can include indications associated with a user profile and/or one or more user devices. The user profile can include historical user data regarding entertainment content access, engagement with supplemental content, and other user preferences. Accordingly, the system can determine the entertainment content that is to be provided to the user and the user device utilized by the user for accessing the entertainment content.

At block 504, the system can determine that enhanced end credits are to be generated for the entertainment content. In particular, the system can be configured to trigger enhancement (and/or enrichment) of the entertainment content to include enhanced and/or enriched end credits. Alternatively, the request for entertainment content can be associated with an indication that triggers generation of the enhanced end credits. More specifically, the indication can be associated with the request for entertainment content based on previous user engagement associated with previous enhancement/enrichment, a service provider requesting that the entertainment be enriched and/or enhanced, and/or that the customer experience associated with the entertainment content is improved via enrichment/enhancement of the end content.

At block 506, the system can identify one or more content segments that are associated with the entertainment content. In particular, the system can be configured to identify the one or more content segments similar to the methods described by FIGS. 1-3. For instance, the system can be configured to identify one or more segment features within the entertainment content that can be utilized to identify individual content segments. Additionally, the one or more segment features identified by the system can be utilized to determine a first set of segment features that is associated with a first portion of the entertainment content and a second set of segment features that are associated with a second portion of the entertainment content. Accordingly, the first set of segment features and the second set of segment features can be utilized to determine a first content segment and a second content segment of the one or more content segments. It should be noted that the first set of segment features and the second set of segment features can be identified based at least on a machine learning algorithm trained via a plurality of graded content segments.

In some examples, the system can determine a third set of segment features that is associated with the first portion and the second portion of the entertainment content. In particular, the system can determine that the first content segment and the second content segments are subsegments of a third content segment. More specifically, the third content segment can be a content segment that corresponds to an introduction, a primary content, an end credit sequence, or other content segment type that includes a plurality of subsegments that represent smaller portions of the entertainment content. For example, the primary content of a film can include a first act, a second act, a third act, and/or other structural portions of the film that can be identified by the system. The subsegments can be associated with color palettes, actors and/or actresses, themes, stylistic choices, and other segment features that distinguish a subsegment from other subsegments while sharing overarching segment features with the segment and one or more additional subsegments. Accordingly, the system can be configured and/or trained to recognize and/or identify structural components of the entertainment content.

At block 508, the system can identify one or more content features that are associated with the one or more content segments. In particular, the system can identify one or more first feature identifiers associated with a first content segment of the one or more content segments and one or more second feature identifiers associated with a second content segment of the one or more content segments. It should be noted that while the segment features describe individual features associated with a segment of the entertainment content (e.g., plain text on a blank background that appears at the bottom of the screen and traverses the screen to disappear at the top can include segment features of "plain text," "blank background," "appearance location: bottom screen border," "disappearance location: top screen border," and other features of the end credits can be utilized to determine the end credit segment of a film), the feature identifiers can be identifiers of the segment features and/or other features of the entertainment content that identify continuity between different instances of those features. For examples, an actor face and an actress face can be associated individually with actor-specific and/or actress-specific identifiers that can be utilized by the system to identify the actor face and the actress face within the entertainment content. Additionally, the actor face and the actress face can be associated with additional identifiers that can be utilized by the system to determine that the actor and the actress are portraying human characters, characters associated with a specific organization within the film, or otherwise associated with each other (e.g., identifiers associated with grim facial features can indicate a mood associated with a scene). Accordingly, the feature identifiers can be utilized to identify and monitor features of the entertainment content through the content segments. Further, the feature identifiers can be utilized to determine content features that include a genre of the entertainment content and/or a scene, individual scenes of the entertainment content, actors, actresses, directorial styles, music, and other aspects of the entertainment content.

At block 510, supplemental information can be determined for the one or more content features. In particular, the system can be configured to identify, based at least on the one or more content features, additional entertainment content that is associated with at least the one or more content features. Additionally, the system can be configured to determine that the additional entertainment content can be utilized to generate the enhanced end credits. The additional entertainment content can be alternate versions of the entertainment content, interviews associated with the entertainment content, reviews of the entertainment content, reactions to the entertainment content, commentary associated with the entertainment content, music from the entertainment content, and other sources that are generally associated with the entertainment content. Further, the system can be configured to determine that the additional entertainment content can include other films, books, television shows, podcasts, audio books, and other entertainment content that is related to the entertainment content via genre, subject, shared actors, shared actresses, shared directors, shared composers, and other content features that are associated with both the entertainment content and the additional entertainment content.

In some examples, the system can utilize user profile information that includes one or more indications of user preferences associated with the enhanced entertainment content. In particular, the system can determine whether the user profile information includes indications regarding user consumption of the additional entertainment content presented via previously enhanced entertainment content, historical content consumption data, user engagement indications, and other indications regarding willingness of the user to engage with and consume the supplemental content provided via the enhanced entertainment content.

At block 512, the supplemental information can be utilized to generate the enhanced end credits for the entertainment content.

Figure 6:
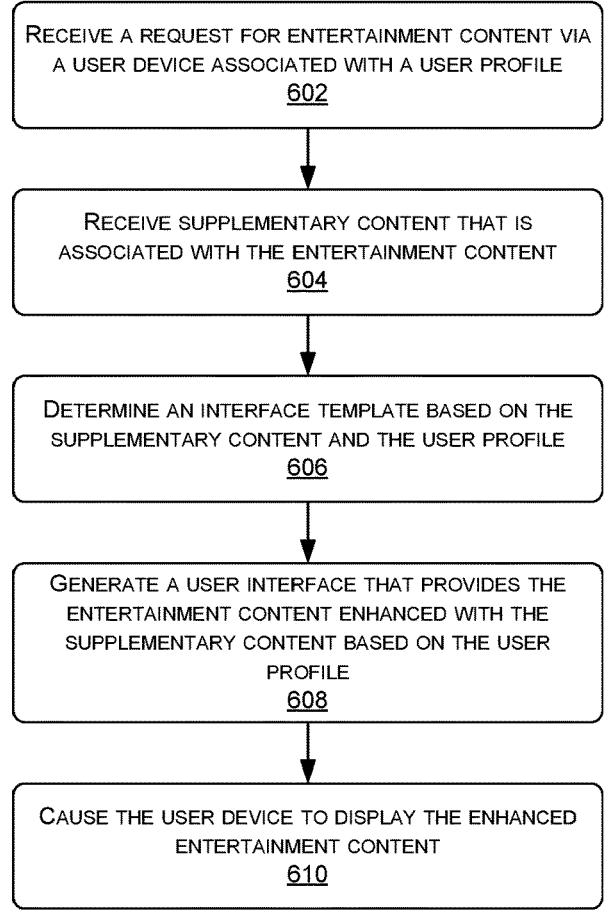
FIG. 6 illustrates an example flow diagram that describes configuration of enhanced end credits from a user interface template that is populated with supplemental content based on content associations and user profile information.

FIG. 6 illustrates an example flow diagram that describes configuration of enhanced end credits from a user interface template that is populated with supplemental content based on content associations and user profile information.

At block 602, a request for entertainment content can be received from a user device, a service platform, and/or a third-party system in a manner similar to those described above by FIGS. 1-5.

At block 604, a system can receive supplemental content associated with the entertainment content. In particular, the system can be provided supplemental content based on content associations determined by an enrichment system. More specifically, an enrichment system can be configured to identify content segments and content features associated with the entertainment content and determine content associations between the entertainment content and the supplemental content. Accordingly, the supplemental content can be provided to the system for presentation to the user. Further, the system can also receive indications of the content segments and/or the content features utilized to identify the supplemental features.

At block 606, the system can determine an interface template based on the supplemental content and the user profile. In particular, the interface template can be determined based at least in part on user profile information stored by the user profile. Additionally, the user profile can include a supplemental content preferences, a content consumption volume, and genre-specific preferences of a user. The supplemental content preferences can indicate one or more supplemental content formats (e.g., interviews, commentary, music, etc.) that is commonly engaged by the user via the user profile. The content consumption volume can indicate an amount of supplemental content that is commonly accessed by the user. For example, the user may access a couple of reviews, skim through interviews, and view a couple of images associated with the entertainment content. The system can be configured to monitor the supplemental content accessed by the user profile and determine that the user has a preference for low volume and/or highlight style supplemental content. The genre-specific preferences can indicate different engagement patterns of a user that are associated with individual content genres. For example, a user may engage much more consistently with athlete and sports supplemental content then the user engages with horror supplemental content. Accordingly, the system may modify the volume of supplemental content provided via the user interface based at least on the genre associated with the entertainment content.

At block 608, the system can generate a user interface from the interface template configured to provide the entertainment content that has been enhanced with the supplemental content based on the user profile. In particular, the interface template can specify an amount of supplemental content that can be effectively displayed via the user interface. The amount of supplemental content that can be displayed by the user interface may be less than the amount of supplemental content identified by the enrichment system. Accordingly, a set of supplemental content can be determined based on individual pieces of supplemental content that satisfy one or more association thresholds. The association thresholds can be associated with a similarity score between content segments and content features of the entertainment content and the supplemental content. More specifically, a first threshold can be configured to determine whether a similarity score for the segment features of the supplement content exceeds a threshold value. Similarly, a second threshold can be configured to determine whether a similarity score for the feature identifiers associated with the supplemental content exceeds a threshold value. Alternatively, an association check can be utilized as a binary check that determines whether a format of the supplemental content is a preferred format identified based on the user profile and/or a compatible format associated with the user device.

At block 610, the system can cause the user device to display the enhanced entertainment content to the user associated with the user profile and the user device. In particular, the system can be configured to transmit the user interface to the user device and cause the supplemental content utilized to populate the interface template to be displayed via the user device. Additionally, the system can be configured to receive one or more indications from the user device that are selections of supplemental content. Accordingly, the system can receive the selections, obtain additional supplemental content associated with the one or more indications, and cause the user device to provide the additional supplemental content. For example, a user can select an interview with a lead actress via the user interface. Additionally, the system can receive the selection of the interview and obtain the interview from a database associated with the interview. Further, the system can then cause the interview to be displayed by an embedded video player within the user interface and/or redirect the user device to an additional user interface configured to provide the interview via the user device.

Figure 7:
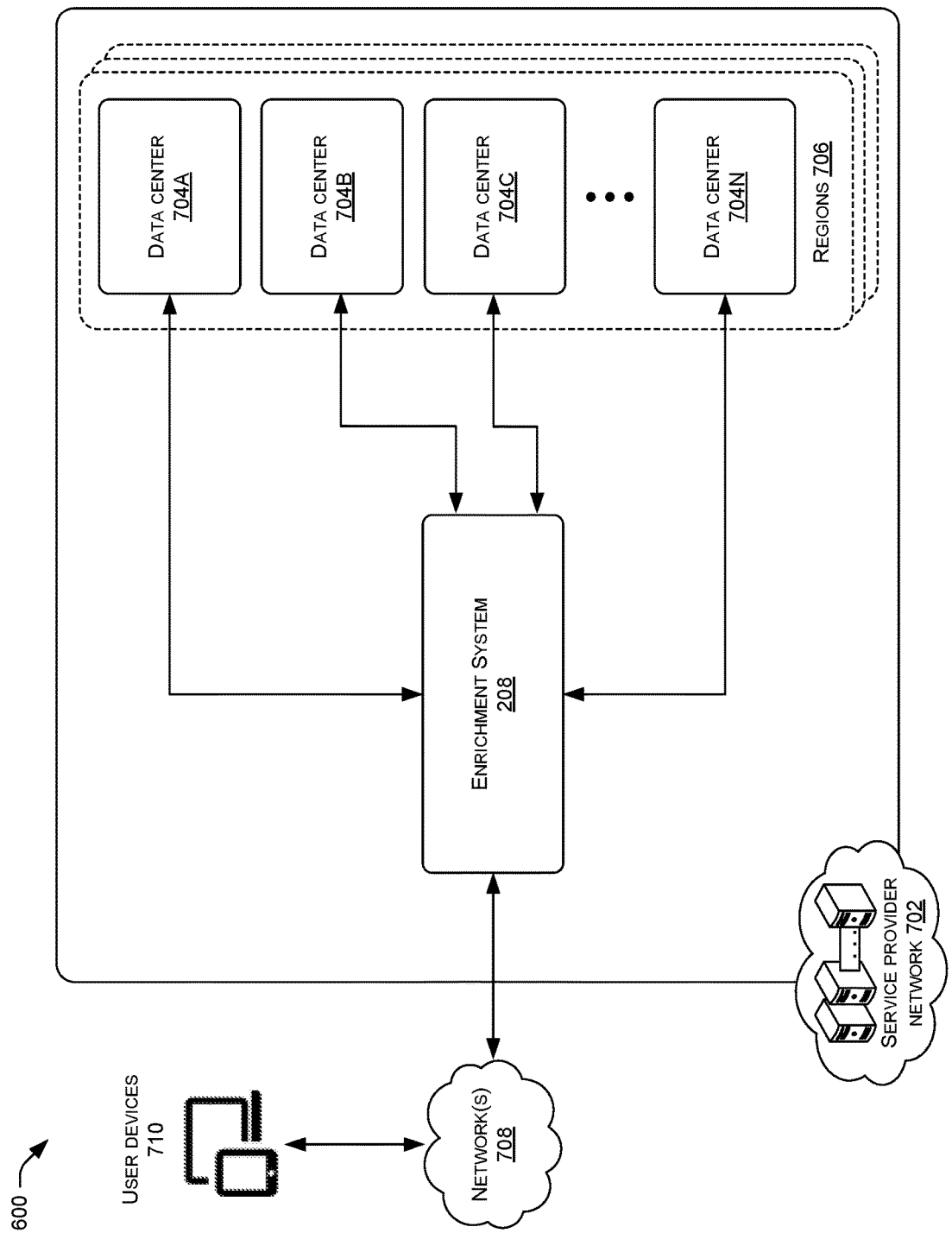
FIG. 7 illustrates a system(s) and network diagram that shows an operating environment that includes a service provider network, wherein the service provider network can include an enrichment system for modifying entertainment content.

FIG. 7 is a system(s) and network diagram that shows an illustrative operating environment 700 that includes a service provider network 702, wherein the service provider network 702 can include an enrichment system 206 for modifying entertainment content. The service provider network 702 may be configured to implement aspects of the functionality described herein, such as the functions of the enrichment system 206 described with respect to FIGS. 1-6 that allows users to generate and manage both the requisition of entertainment content modification and the management of the entertainment content modification. The service provider network 702 may provide computing resources, like virtual machine (VM) instances and storage, on a permanent or an as-needed basis. The computing resources provided by the service provider network 702 may include data processing resources, data storage resources, networking resources, data communication resources, network services, and the like. Among other types of functionality, the computing resources provided by the service provider network 702 may be utilized to implement the various services and components described above.

Each type of computing resource provided by the service provider network 702 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 702 may also be configured to provide other types of computing resources not mentioned specifically herein.

The computing resources provided by the service provider network 702 may be enabled in one embodiment by one or more data centers 704A-704N (which might be referred to herein singularly as "a data center 804" or in the plural as "the data centers 704"). The data centers 704 are facilities utilized to house and operate computer systems and associated components. The data centers 704 typically include redundant and backup power, communications, cooling, and security systems. The data centers 704 may also be located in geographically disparate locations, or regions 706. One illustrative embodiment for a data center 704 that may be utilized to implement the technologies disclosed herein will be described below with regard to FIG. 8.

The customer services that transmit entertainment content modification requests to the service provider network 702 for the enrichment system/service 206, may access the computing resources provided by the service provider network 702 over any wired and/or wireless network(s) 708, which may be a wide area communication network ("WAN"), such as the Internet, an intranet or an Internet service provider ("ISP") network or a combination of such networks 708. For example, and without limitation, user devices 710 can be operated by the users to transmit user requests to the service provider network 702, or computing resources thereof, by way of the network(s). It should be appreciated that a local-area network ("LAN"), the Internet, or any other networking topology known in the art that connects the data centers 704 to remote clients and other users may be utilized. It should also be appreciated that combinations of such networks may also be utilized. The enrichment system 206 offered as a service by the service provider network 702 may manage the deployment of computing resources of the service provider network 702 when generating and managing certificate authorities.

Figure 8:
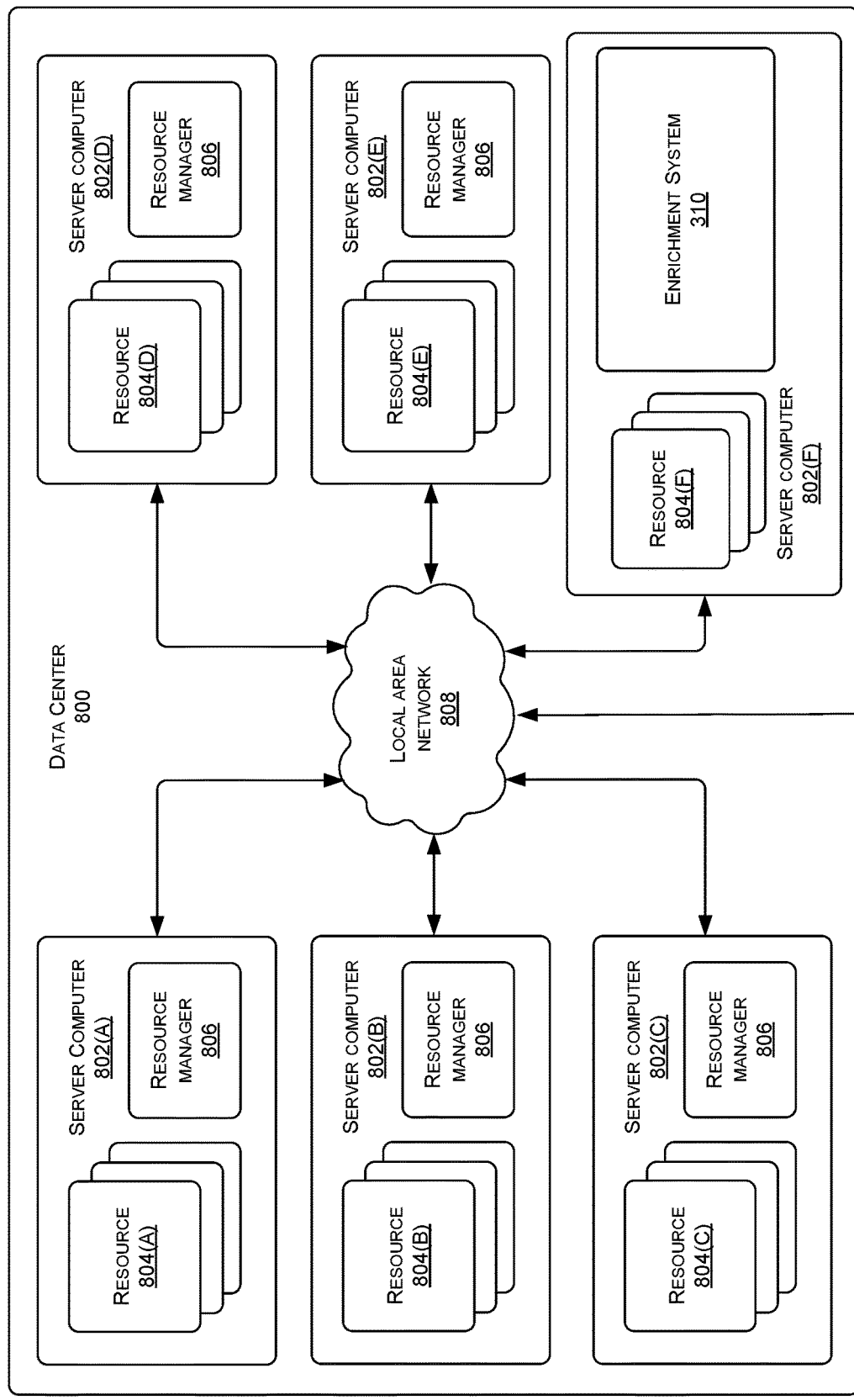
FIG. 8 illustrates a computing system diagram that illustrates one configuration for a data center that implements aspects of the entertainment content enhancement and enrichment services disclosed herein.

FIG. 8 is a computing system diagram that illustrates one configuration for a data center 800 that implements aspects of the entertainment content enhancement and enrichment services disclosed herein. The example data center 800 shown in FIG. 8 can include several server computers 802A-802F (which might be referred to herein singularly as "a server computer 802" or in the plural as "the server computers 802") for providing computing resources 804A-804E.

The server computers 802 may be standard tower, rack-mount, or blade server computers configured appropriately for providing the computing resources described herein (illustrated in FIG. 8 as the computing resources 804A-804E). The computing resources provided by the service provider network may be data processing resources such as VM instances or hardware computing systems, database clusters, computing clusters, storage clusters, data storage resources, database resources, networking resources, and others. Some of the server computers 802 may also be configured to execute a resource manager 806 capable of instantiating and/or managing the computing resources. In the case of VM instances, for example, the resource manager 806 may be a hypervisor or another type of program configured to enable the execution of multiple VM instances on a single server computer 802. Server computers 802 in the data center 800 may also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of a plurality of data centers, between each of the server computers 802A-802F in each data center 800, and, potentially, between computing resources in each of the server computers 802. It should be appreciated that the configuration of the data center 800 described with reference to FIG. 8 is merely illustrative and that other implementations may be utilized.

The data center 800 shown in FIG. 8 also includes a server computer 802F that may execute some or all of the software components described above by FIGS. 1-6. For example, and without limitation, the server computer 802F (and the other server computers 802) may generally correspond to a server/computing device configured to execute components including, without limitation, the enrichment system 206 that processes and correlated user requests, as described herein, and/or the other software components described above. The server computer 802F may also be configured to execute other components and/or to store data for providing some or all of the functionality described herein. In this regard, it should be appreciated that the components illustrated in FIG. 8 as executing on the server computer 802F may execute on many other physical or virtual servers in the data centers 800 in various embodiments. Thus, the data center 800 in FIG. 8 may also include a plurality of server computers 802 that execute a fleet of VM instances.

Figure 9:
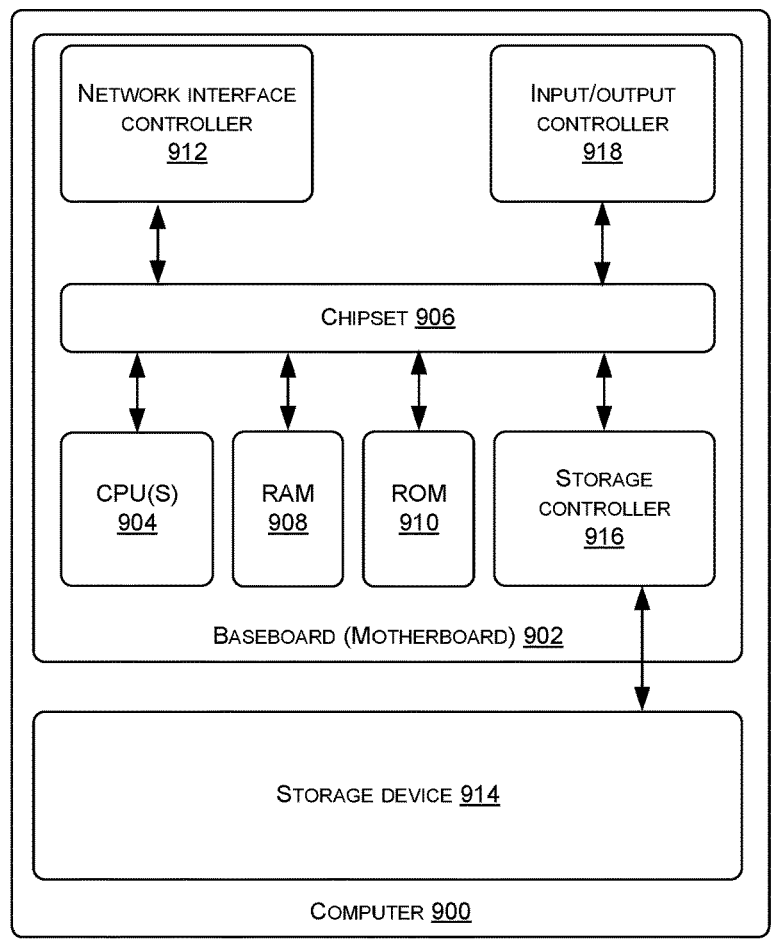
FIG. 9 illustrates an example computer architecture for a computer or a server capable of executing program components for implementing enhancement systems and enrichment systems.

FIG. 9 shows an example computer architecture for a computer 900 capable of executing program components for implementing the enhancement systems and enrichment systems described above. The computer architecture shown in FIG. 9 illustrates a server computer, workstation, desktop computer, laptop, tablet, network appliance, e-reader, smartphone, or other computing device, and may be utilized to execute any of the software components presented herein. In some examples, the computer 900 may correspond to one or more computing devices that implements the components and/or services described herein (e.g., the user devices 710, the enrichment system 206, etc.). In some additional examples, the computer 900 may correspond the enrichment system and/or the enhancement system. In some further examples, the computer 900 can be configured to interact with or correspond to any of the systems and/or implement the methods discussed in FIGS. 1-8.

The computer 900 includes a baseboard 902, or "motherboard," which is a printed circuit board to which a multitude of components or devices may be connected by way of system(s) bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

In some alternative examples, the CPUs 904 can be replaced and/or be configured to interact with one or more processors. It should be noted that the one or more processors can include the CPUs 904, one or more graphics processing units (GPUs), both the CPUs 904 and GPUs, and/or other processing units or components known in the art. For example, the one or more processors can include one or more processing units configured as controllers, microcontrollers, computational devices, microprocessors, and/or other computational devices configured to control and/or cause a user device to execute the operations described above.

The chipset 906 provides an interface between the CPUs 904 and the remainder of the components and devices on the baseboard 902. The chipset 906 may provide an interface to a random-access memory (RAM) 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the LAN 808. The chipset 906 may include functionality for providing network connectivity through a network interface controller (NIC) 912, such as a gigabit Ethernet adapter. The NIC 912 is capable of connecting the computer 900 to other computing devices over the LAN 808. It should be appreciated that multiple NICs 912 may be present in the computer 900, connecting the computer to other types of networks and remote computer systems. In some examples, the network interface controller can be associated with one or more transceivers that can include one or more wired or wireless transceivers. For example, the transceivers can include a network adapter, a LAN adapter, an address associated with a network connection, or another device permitting communications to be sent and received. Additionally, the one or more transceivers can comprise any wireless transceiver capable of engaging in wireless, radio frequency (RF) communication. Further, the one or more transceivers can also include other wireless modems, such as Wi-Fi, WiMAX, Bluetooth, and/or infrared communication modems.

The computer 900 may be connected to a mass storage device 914 that provides non-volatile storage for the computer 900. The mass storage device 914 may store an operating system, programs, and/or components including, without limitation, the enrichment system 206 that processes data using data pipelines, as described herein, and data, which have been described in greater detail herein. The mass storage device 914 may be connected to the computer 900 through a storage controller 916 connected to the chipset 906. The mass storage device 914 may consist of one or more physical storage units. The storage controller 916 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 914 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 914 is characterized as primary or secondary storage, and the like.

For example, the computer 900 may store information to the mass storage device 914 by issuing instructions through the storage controller 916 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 914 by detecting the physical states or characteristics of one or more particular locations within the physical storage units.

In addition to the mass storage device 914 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900. In some examples, the operations performed by the service provider network 702, and or any components and/or services included therein, may be carried out by the processor(s).

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 914 may store an operating system utilized to control the operation of the computer 900. According to one embodiment, the operating system comprises the LINUX operating system. According to another embodiment, the operating system comprises the WINDOWS® SERVER operating system from MICROSOFT® Corporation of Redmond, Wash. According to further embodiments, the operating system may comprise the UNIX operating system or one of its variants. It should be appreciated that other operating systems may also be utilized. The mass storage device 914 may store other system or application programs and data utilized by the computer 900.

In one embodiment, the mass storage device 914 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-5. The computer 900 may also include computer-readable storage media having instructions stored thereupon for performing any of the other computer-implemented operations described herein.

The computer 900 may also include one or more input/output controllers 918 for receiving and processing input from a number of input devices, such as a keyboard, a mouse, a touchpad, a touch screen, an electronic stylus, or other type of input device. Similarly, an input/output controller 918 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

While various examples and embodiments are described individually herein, the examples and embodiments may be combined, rearranged, and modified to arrive at other variations within the scope of this disclosure. Additionally, and although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:
1. A method comprising:
   receiving a request for entertainment content to be provided to a user device for consumption, the request for the entertainment content comprising an enhanced end credits indication;

determining, based at least in part on the enhanced end credits indication, that an end credit segment of the entertainment content is to be enhanced;

determining one or more content segments of the entertainment content;

determining one or more content features associated with the one or more content segments, wherein the one or more content features are associated with the end credit segment;

determining, based at least in part on the one or more content features, supplemental information associated with the one or more content features; and generating, based at least in part on the supplemental information stored by an association database, enhanced end credits that include information from the end credit segment augmented with the supplemental information associated with the one or more content features.

2. The method of claim 1, further comprising:

determining, based at least in part on the request, a user profile associated with the user device, the user profile associated with an engagement history that includes one or more supplemental content preferences;

determining, based at least on the supplemental information, a set of supplemental information associated with the one or more supplemental content preferences; and displaying, via the user device, the enhanced end credits to include the set of supplemental information.

3. The method of claim 1, wherein determining the one or more content segments further comprises:

identifying one or more segment features within the entertainment content;

determining that a first set of segment features of the one or more segment features is associated with a first portion of the entertainment content;

determining that a second set of segment features of the one or more segment features is associated with a second portion of the entertainment content; and determining that the first set of segment features is associated with a first content segment and the second set of segment features is associated with a second content segment.

4. The method of claim 3, wherein determining that the first set of segment features is associated with the first content segment further comprises:

determining, based at least in part on a plurality of graded content segments, that the first set of segment features associated with the first content segment meets or exceeds a segment feature threshold for identifying the first portion of the entertainment content as the first content segment.

5. The method of claim 3, wherein determining that the first set of segment features is associated with the first content segment and that the second set of segment features is associated with the second content segment further comprises:

determining that a third set of segment features of the one or more segment features is associated with the first portion of the entertainment content and the second portion of the entertainment content; and determining that the first content segment and the second content segment are subsegments of a third content segment associated with the third set of segment features.

6. The method of claim 1, wherein determining the one or more content features further comprises:

identifying one or more first feature identifiers associated with a first content segment of the one or more content segments;

determining one or more second feature identifiers associated with a second content segment of the one or more content segments; and determining that the one or more first feature identifiers and the one or more second feature identifiers are associated with a content feature of the one or more content features.

7. The method of claim 6, wherein determining that the one or more first feature identifiers and the one or more second feature identifiers are associated with the content feature further comprises:

determining, based at least in part on a plurality of graded content segments, that the one or more first feature identifiers and the one or more second feature identifiers include at least one of an entertainment genre, a type of entertainment content, or an individual associated with the entertainment content.

8. The method of claim 1, wherein determining supplemental information associated with the one or more content features further comprises:

identifying, based at least in part on the one or more content features, additional entertainment content that is associated with the one or more content features; and determining, based at least in part on user profile information associated with a user that submitted the request, that the additional entertainment content is to be utilized to generate the enhanced end credits.

9. The method of claim 8, wherein the user profile information includes one or more indications of user preferences associated with the additional entertainment content and historical content consumption data that includes a record of engagement for the user with previous supplemental content.

10. A system comprising:

one or more processors; and a memory storing one or more instructions that are executable by the one or more processors to perform operations comprising:

receiving a request for entertainment content to be provided to a user device for consumption, the request for the entertainment content comprising an enhanced end credits indication;

determining, based at least in part on the enhanced end credits indication, that an end credit segment of the entertainment content is to be enhanced;

determining one or more content segments of the entertainment content;

determining one or more content features associated with the one or more content segments, wherein the one or more content features are associated with the end credit segment;

determining, based at least in part on the one or more content features, supplemental information associated with the one or more content features; and generating, based at least in part on the supplemental information stored by an association database, enhanced end credits that include information from the end credit segment augmented with the supplemental information associated with the one or more content features.

11. The system of claim 10, the operations further comprising:

determining that the enhanced end credits are to replace the end credit segment; and modifying the entertainment content to remove the end credit segment and insert the enhanced end credits at an end of a primary content segment of the entertainment content.

12. The system of claim 10, the operations further comprising providing at least a portion of the supplemental information to the user device.

13. The system of claim 10, wherein the supplemental information is further determined based at least in part on an engagement history of a user associated with the user device.

14. The system of claim 10, the operations further comprising causing display of an external source associated with the supplemental information on a user interface.

15. The system of claim 10, the operations further comprising providing the enhanced end credits to the user device via a user interface generated based at least in part on a profile associated with a user of the user device.

16. One or more non-transitory computer-readable media storing executable instructions that, when executed, cause one or more computing devices to perform acts comprising:
   receiving a request for entertainment content to be provided to a user device for consumption, the request for the entertainment content comprising an enhanced end credits indication;
   determining, based at least in part on the enhanced end credits indication, that an end credit segment of the entertainment content is to be enhanced;
   determining one or more content segments of the entertainment content;
   determining one or more content features associated with the one or more content segments, wherein the one or more content features are associated with the end credit segment;
   determining, based at least in part on the one or more content features, supplemental information associated with the one or more content features; and
   generating, based at least in part on the supplemental information stored by an association database, enhanced end credits that include information from the end credit segment augmented with the supplemental information associated with the one or more content features.

17. The one or more non-transitory computer-readable media of claim 16, the acts further comprising causing display of an additional segment of the entertainment content associated with the supplemental information on a user interface.

18. The one or more non-transitory computer-readable media of claim 16, wherein the supplemental information is further determined based at least in part on one or more content consumption preferences of a user associated with the user device.

19. The one or more non-transitory computer-readable media of claim 16, the acts further comprising providing at least a portion of the supplemental information in a display format associated with a user associated with the user device.

20. The one or more non-transitory computer-readable media of claim 16, wherein determining the supplemental information comprises transmitting, to the association database, an indication associated with the one or more content features, wherein the indication causes the association database to provide the supplemental information.

\* \* \* \* \*